United States Patent
Cho et al.

(10) Patent No.: US 11,610,027 B2
(45) Date of Patent: Mar. 21, 2023

(54) ELECTRONIC DEVICE INCLUDING SLIDE DOOR AUTOMATICALLY OPENED OR CLOSED

(71) Applicant: Samsung Electronics Co., Ltd., Gyeonggi-do (KR)

(72) Inventors: Hyunje Cho, Gyeonggi-do (KR);
Chahoon Park, Gyeonggi-do (KR);
Gayoung Jung, Gyeonggi-do (KR);
Yeungtaek Cho, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 698 days.

(21) Appl. No.: 16/680,806

(22) Filed: Nov. 12, 2019

(65) Prior Publication Data

US 2020/0159971 A1    May 21, 2020

(30) Foreign Application Priority Data

Nov. 15, 2018   (KR) .......................... 10-2018-0140734

(51) Int. Cl.
*G06F 21/86* (2013.01)
*E05B 65/00* (2006.01)
(Continued)

(52) U.S. Cl.
CPC .......... *G06F 21/86* (2013.01); *E05B 65/0067* (2013.01); *E05D 15/0608* (2013.01);
(Continued)

(58) Field of Classification Search
CPC ........ G06F 21/86; G06F 1/182; G06F 1/1616; E05F 15/60; E05B 65/0067; E05D 15/0608; E05Y 2900/606
See application file for complete search history.

(56) References Cited

U.S. PATENT DOCUMENTS 7,438,486 B2 * 10/2008 Ho .......................... G03B 17/02
455/575.4
7,658,500 B2 * 2/2010 Jin ........................ G03B 21/145
359/511
(Continued)

FOREIGN PATENT DOCUMENTS

KR        10-0920744 B1   10/2009
KR    10-2011-0054249 A    5/2011
(Continued)

OTHER PUBLICATIONS

International Search Report dated Feb. 24, 2020.

*Primary Examiner* — Mark A Williams
(74) *Attorney, Agent, or Firm* — Cha & Reiter, LLC

(57) ABSTRACT

An electronic device and method are disclosed. The electronic device includes a housing defining an opening, a driving actuator, a slide door moveable to selectively cover and expose the opening, a link connecting the slide door and the driving actuator, the link linearly moveable in accordance with a driving operation of the driving actuator to move the slide door, a forcible open blocker that is moveable to restrict opening of the slide door when the opening is closed, and to release blockage of the opening of the slide door based on a linear movement of the link, and a processor. The processor implements the method, including: receiving an external input signal and identify whether to expose or cover the opening based on the external input signal, and activating the driving actuator to expose or cover the opening according to a result of the identification.

19 Claims, 12 Drawing Sheets

(51) Int. Cl.
*E05F 15/60* (2015.01)
*G06F 1/18* (2006.01)
*E05D 15/06* (2006.01)
*G06F 1/16* (2006.01)

(52) U.S. Cl.
CPC .............. *E05F 15/60* (2015.01); *G06F 1/182* (2013.01); *E05Y 2900/606* (2013.01); *G06F 1/1616* (2013.01)

(56) References Cited

U.S. PATENT DOCUMENTS

| | | | | |
|---|---|---|---|---|
| 2007/0109272 | A1* | 5/2007 | Orsley | H01L 25/167 345/173 |
| 2009/0268388 | A1* | 10/2009 | Tsai | G06F 1/1624 361/679.01 |
| 2009/0323280 | A1* | 12/2009 | Wu | H05K 7/20127 361/690 |
| 2012/0140422 | A1* | 6/2012 | Park | G06F 1/1675 361/724 |
| 2013/0314857 | A1* | 11/2013 | Ohnishi | H05K 7/00 361/679.01 |
| 2014/0031093 | A1 | 1/2014 | Song et al. | |
| 2020/0374432 | A1* | 11/2020 | Cho | H04N 5/2257 |
| 2021/0089082 | A1* | 3/2021 | Lee | F16K 1/00 |

FOREIGN PATENT DOCUMENTS

| | | |
|---|---|---|
| KR | 10-1681071 B1 | 11/2016 |
| KR | 10-1786327 B1 | 10/2017 |
| KR | 10-2019-0084585 A | 7/2019 |

\* cited by examiner

ELECTRONIC DEVICE INCLUDING SLIDE DOOR AUTOMATICALLY OPENED OR CLOSED

CROSS-REFERENCE TO RELATED APPLICATION(S)

This application is based on and claims priority under 35 U.S.C. 119 to Korean Patent Application No. 10-2018-0140734, filed on Nov. 15, 2018, in the Korean Intellectual Property Office, the disclosures of which are herein incorporated by reference in their entireties.

TECHNICAL FIELD

The disclosure relates to an electronic device including a slide door that is automatically opened or closed.

BACKGROUND

With the growth of digital technologies, a great variety of electronic devices such as a mobile communication terminal, a smart phone, a tablet personal computer (tablet PC), a notebook, a personal digital assistant (PDA), a wearable device, or a digital camera have been developed and are now in widespread use.

These electronic devices allow for insertable/extractable components such as an external memory card, a subscriber identity module (SIM) card, and a digital pens.

In particular, recent trends have sought for an increased content storage capacity in the electronic devices, and greater operational speeds. Accordingly, an external memory card having improved capacity and read/write speeds have been developed. Thus, users now more commonly utilize external memory cards, such as solid state drives (SSD), which in turn increases the demand for data security for accessing information stored in the external memory card.

The insertable/extractable components (e.g., or a component tray containing the component) may be inserted into a designated port (i.e., or an opening) of the electronic device. In addition, the component may be extracted through a physical extraction functionality, such as pressing an ejection button of the component, or accessing an ejection function through a hole in or adjacent to the component tray, using a small, thin tool.

However, these physical extraction methods allow extraction purely by application of physical force without requiring any kind of user authentication. Accordingly, these components are vulnerable to being taken by non-secure persons, and the security of the data may thereby be compromised.

SUMMARY

The disclosure is to provide an electronic device capable of opening or closing an opening thereof, into which a component is insertable, through a slide door that is automatically opened and closed under predetermined conditions.

According to certain embodiments of the disclosure, an electronic device may include a driving actuator, a slide door moveable to selectively cover and expose the opening, a link connecting the slide door and the driving actuator, the link linearly moveable in accordance with a driving operation of the driving actuator to move the slide door, a forcible open blocker that is moveable to restrict opening of the slide door when the opening is closed, and to release blockage of the opening of the slide door based on a linear movement of the link, and a processor configured to: receive an external input signal and identify whether to expose or cover the opening based on the external input signal, and activate the driving actuator to expose or cover the opening according to a result of the identification.

According to certain embodiments of the disclosure, a method in an electronic device includes: receiving by an input unit and/or a communication unit an external input signal, determining, by a processor, whether to expose or cover an opening defined in a housing of the electronic device based on the external input signal, and when the external input signal satisfies a condition for exposing the opening, activating a driving actuator to produce a linear movement of a link in a first direction, wherein the linear movement of the link in the first direction causes a forcible open blocker to release restriction of exposing the opening, and wherein a slide door connected to the link moves to expose the opening in accordance with the linear movement of the link in the first direction.

DETAILED DESCRIPTION

Hereinafter, embodiments of the disclosure will be described in detail with reference to accompanying drawings.

Figure 1A:
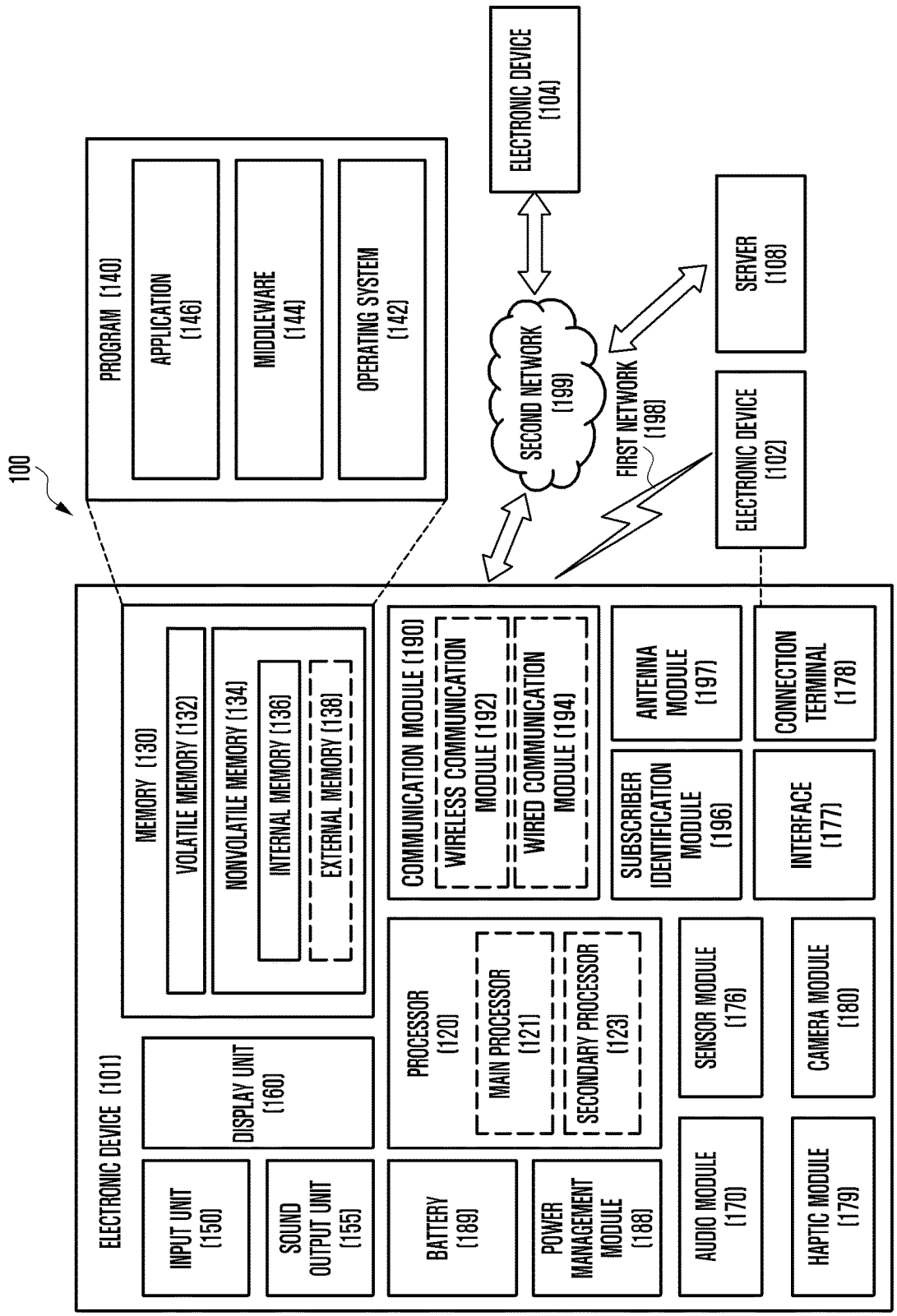
FIG. 1A is a block diagram illustrating an example electronic device in a network environment according to certain embodiments.

FIG. 1A illustrates an electronic device in a network environment according to an embodiment of the disclosure.

Referring to FIG. 1A, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 includes a processor 120, memory 130, an input device 150, an audio output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The audio output device 155 may output sound signals to the outside of the electronic device 101. The audio output device 155 may include, for example, a speaker or a receiver. The speaker may be used for general purposes, such as playing multimedia or playing record, and the receiver may be used for an incoming calls. The receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the audio output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). The connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. The antenna module 197 may include an antenna including a radiating element implemented using a conductive material or a conductive pattern formed in or on a substrate (e.g., a printed circuit board (PCB)). The antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

An electronic device according to an embodiment may be one of various types of electronic devices. The electronic device may include a portable communication device (e.g., a smart phone), a computer device, a portable multimedia device, a portable medical device, a camera, a wearable device, or a home appliance. However, the electronic device is not limited to any of those described above.

Certain embodiments of the disclosure and the terms used herein are not intended to limit the technological features set forth herein to particular embodiments and include various changes, equivalents, or replacements for a corresponding embodiment.

With regard to the description of the drawings, similar reference numerals may be used to refer to similar or related elements.

A singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases.

As used herein, such terms as "1st" and "2nd", or "first" and "second" may be used to simply distinguish a corresponding component from another, and does not limit the components in other aspect (e.g., importance or order). If an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

The term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 1B:
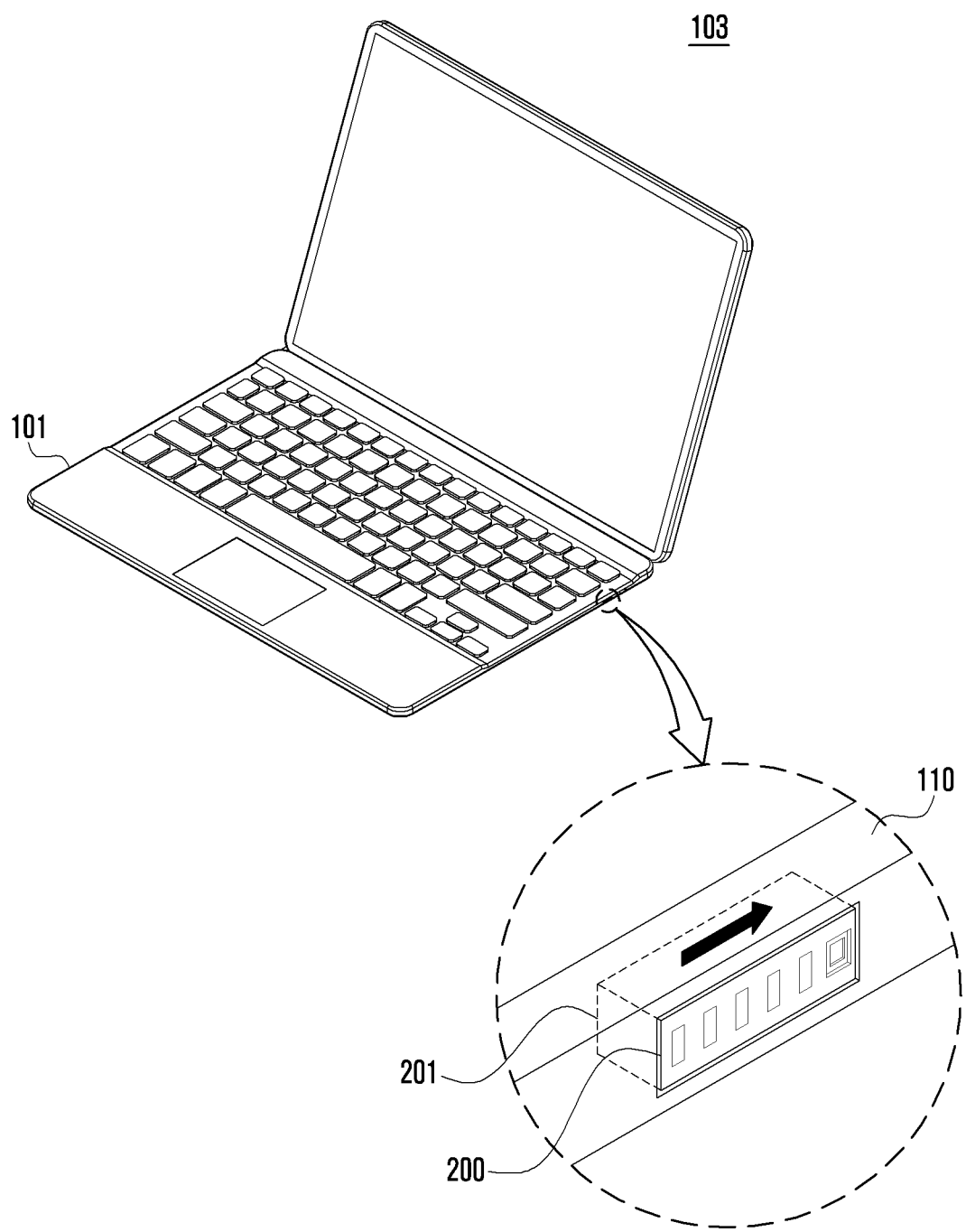
FIG. 1B is a perspective view illustrating an appearance of an example electronic device according to certain embodiments.

FIG. 1B is a perspective view 103 illustrating an appearance of an electronic device 101 according to certain embodiments.

According to certain embodiments, the electronic device 101 may include a housing 110 and an opening 201 formed inwardly from one surface of the housing 110. The opening 201 allows a component to be inserted or extracted.

According to certain embodiments, the opening 201 may be opened or closed in accordance with an opening or closing operation of a slide door 200.

For example, the opening 201 may be closed by the slide door 200 as shown in FIG. 1B. Also, the opening 201 may be opened by moving the slide door 200 laterally, and thus exposed to the outside.

The electronic device 101 according to certain embodiments may control the slide door 200 to be automatically opened or closed using a driving actuator disposed inside the electronic device 101. Through this, the opening 201 can be opened or closed.

For example, when the user wants to insert or extract a certain component into or from the opening 201, the electronic device 101 may open the slide door 200 to open the opening 201, based on a user input.

For example, the electronic device 101 may close the slide door 200 to close the opening 201 after the user inserts or extracts the component into or from the opening 201. Alternatively or additionally, the electronic device 101 may control the slide door 200 to be automatically closed after the elapse of a predetermined time from the open of the slide door 200 or in response to a user input.

According to certain embodiments, components insertable into the opening 201 opened and closed by the slide door 200 may include an external memory card or a SIM card that can be recognized by the electronic device 101. According to another example, such components may include a digital pen that supports an input function of the electronic device 101.

According to certain embodiments, the electronic device 101 may open or close the slide door 200, based on an external input signal. For example, the electronic device 101 may receive the external input signal through an input module (e.g., the input device 150 in FIG. 1A) or a communication module (e.g., the communication module 190 in FIG. 1A) of the electronic device 101.

For example, the external input signal may include a user input. For example, the electronic device 101 may identify whether the user input satisfies a predetermined authentication condition, and based on the identification result, control the slide door 200 to be opened or closed. According to an embodiment, the electronic device 101 may identify whether the received external input signal (e.g., the user input) meets the predetermined authentication condition. Then, if it is determined that the external input signal meets the authentication condition (i.e., successful authentication), the electronic device 101 may operate the driving actuator to control the slide door 200 to be opened or closed. The external input signal may include user's biometric information such as fingerprint information, iris information, or face shape information. For example, the electronic device 101 may obtain the external input signal including the biometric information by using a camera module thereof.

According to another embodiment, the external input signal may include a power supply control signal for the electronic device 101. For example, if it is determined, based on the power supply control signal, that the system power supply to the electronic device 101 is stopped, the electronic device 101 may operate the driving actuator to control the slide door 200 to be automatically closed.

According to still another embodiment, the external input signal may include a physical input signal created by pressing a physical key or button provided in the electronic device 101.

According to certain embodiments, when controlling the driving actuator to open or close the slide door 200, the electronic device 101 may display movement state information of the slide door 200 on a display thereof.

FIGS. 2A to 2D are diagrams illustrating an operation of moving a slide door 200 to open an opening 201 in a slide door driving environment 202 of an electronic device 101 according to certain embodiments.

Figure 2A:
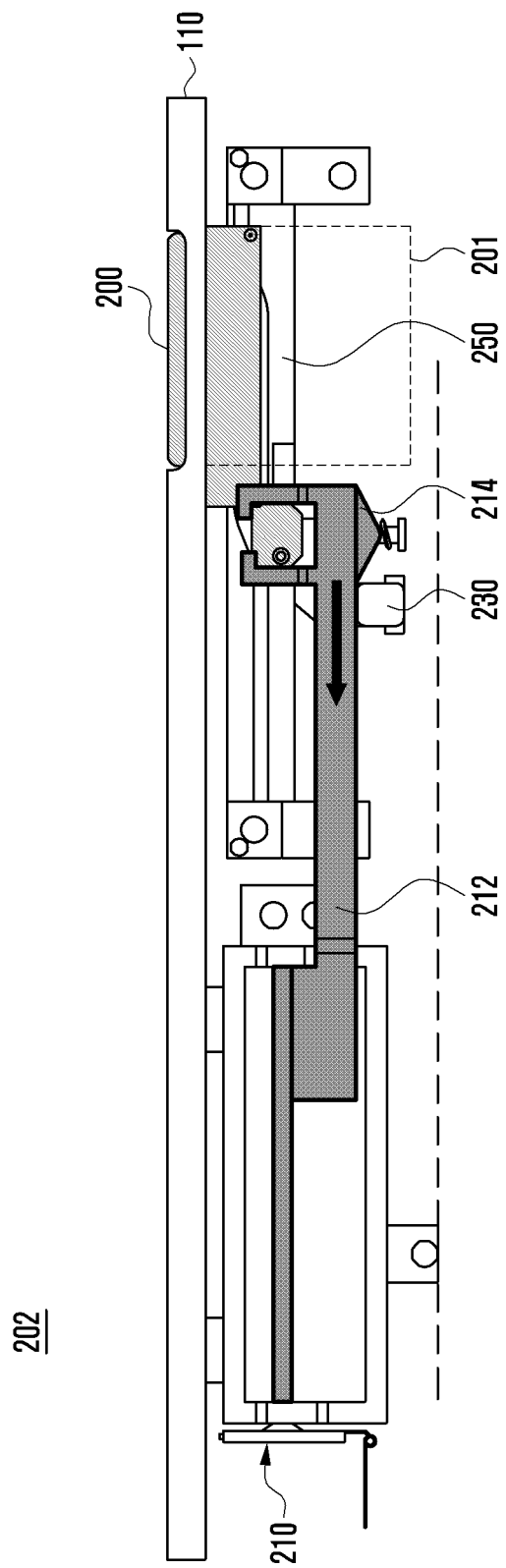
FIGS. 2A to 2D are diagrams illustrating an example operation of moving a slide door to open an opening of an electronic device according to certain embodiments.

Referring to FIGS. 2A to 2D, the electronic device 101 may include an opening 201 formed on one surface of the housing 110. The opening 201 may be closed from the outside by movement of the slide door 200 as shown in FIG. 2A, and may be opened through another movement of the slide door 200, and thereby exposed to an exterior of the device, which is at least in partly shown in FIG. 2D.

According to certain embodiments, the electronic device 101 may include a driving actuator 210 and a link 212 connected to the driving actuator 210, which may linearly move in accordance with a driving operation of the driving actuator 210. The link 212 may also be connected to the slide door 200. For example, the link 212 may move the slide door 200 connected to the link 212 by a linear movement of the link 212. According to an embodiment, the slide door 200 may be disposed to engage with a ring-like portion formed at one end of the link 212 and may move together with the link 212.

For example, when the driving actuator 210 is operated by a processor (e.g., the processor 120 in FIG. 1A) of the electronic device 101, the link 212 may linearly move in accordance with the driving operation of the driving actuator 210. The slide door 200 may also move based on the linear movement of the link 212.

According to certain embodiments, the electronic device 101 may further include a forcible open blocker 230. The forcible opening blocker 230 may block (e.g., restrict or prevent) an opening of the slide door 200 when the opening 201 is closed by the slide door 200. In certain embodiments, when the link 212 is linearly moved in accordance with the driving operation of the driving actuator 210, the blockage of the opening of the slide door 200 by the forcible open blocker 230 may be released, based on the linear movement of the link 212.

According to certain embodiments, the electronic device 101 may further include a guide rail 250 disposed on and/or under the slide door 200, to guide movement of the slide door 200 when the slide door 200 moves in accordance with the movement of the link 212. Referring to FIG. 2A, in the electronic device 101, the opening 201 included in the housing 110 may be closed by the slide door 200.

The electronic device 101 may whether to open or close the slide door 200, based on an external input signal, and may control the slide door 200 according to the identification result. For example, the electronic device 101 may identify, through a processor (e.g., the processor 120 in FIG. 1A), whether to open the opening 201 that is presently closed by the slide door 200.

For example, when determining that the external input signal meets a condition for opening the opening 201, the processor 120 of the electronic device 101 may operate the driving actuator 210 such that the link 212 moves in a first direction (e.g., a direction in which the link 212 is away from the opening 201 as shown in FIG. 2A).

Figure 2B:
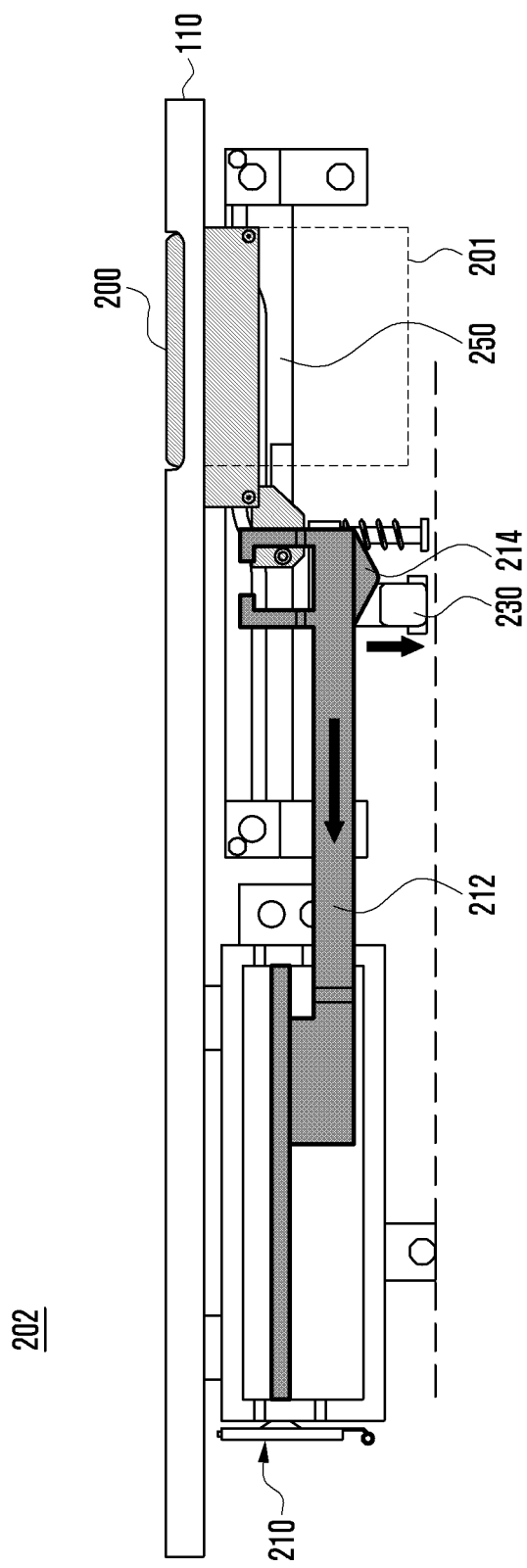

Referring to FIG. 2B, when the link 212 moves in the first direction in accordance with the driving operation of the driving actuator 210, a protruding portion 214 formed on one surface of the link 212 may push upwards against the forcible open blocker 230 in a direction perpendicular to the first direction in which the link 212 moves. As a result, the forcible open blocker 230 may move from a first position of blocking the opening of the slide door 200 (e.g., the position of the forcible open blocker 230 shown in FIGS. 2A and 2D), to a second position which permits release of the blockage of the opening (e.g., the position of the forcible open blocker 230 shown in FIGS. 2B and 2C).

For example, when the forcible open blocker 230 is located at a position where the opening of the slide door 200 is blocked, the slide door 200 may be caught by the forcible open blocker 230 and thereby blocked from being opened. In addition, when the forcible open blocker 230 is located at a position where the blockage of the opening is released, the slide door 200 may be freely opened or closed without obstruction by the forcible open blocker 230.

Figure 2C:
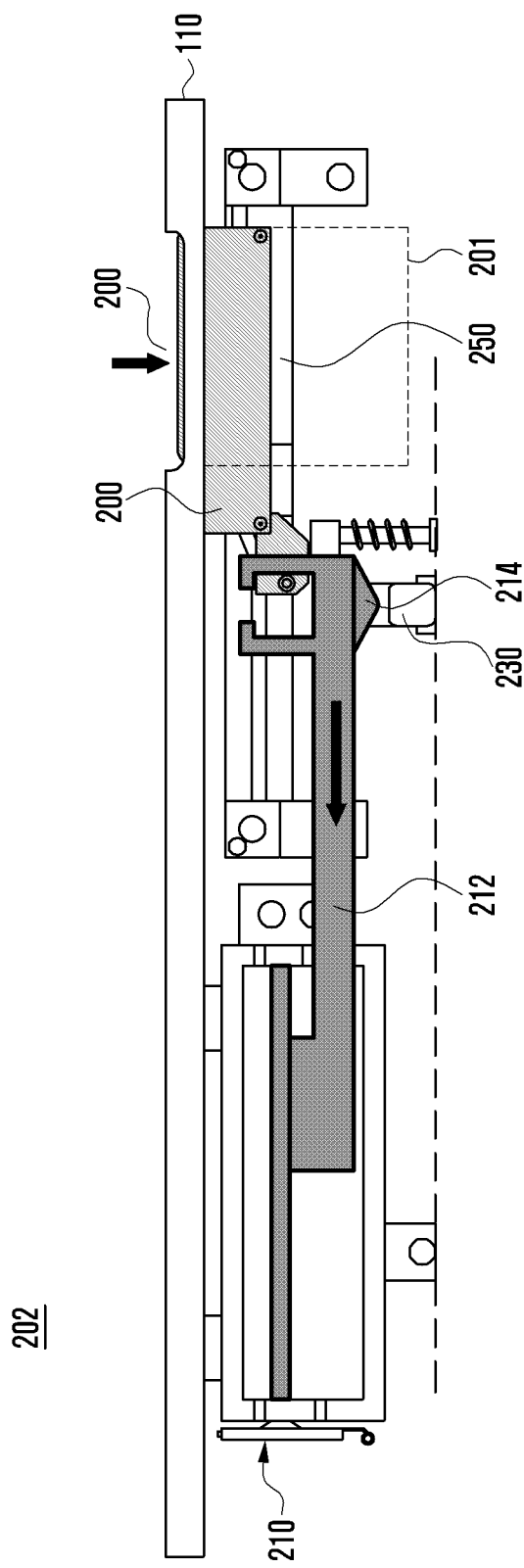
Figure 2D:
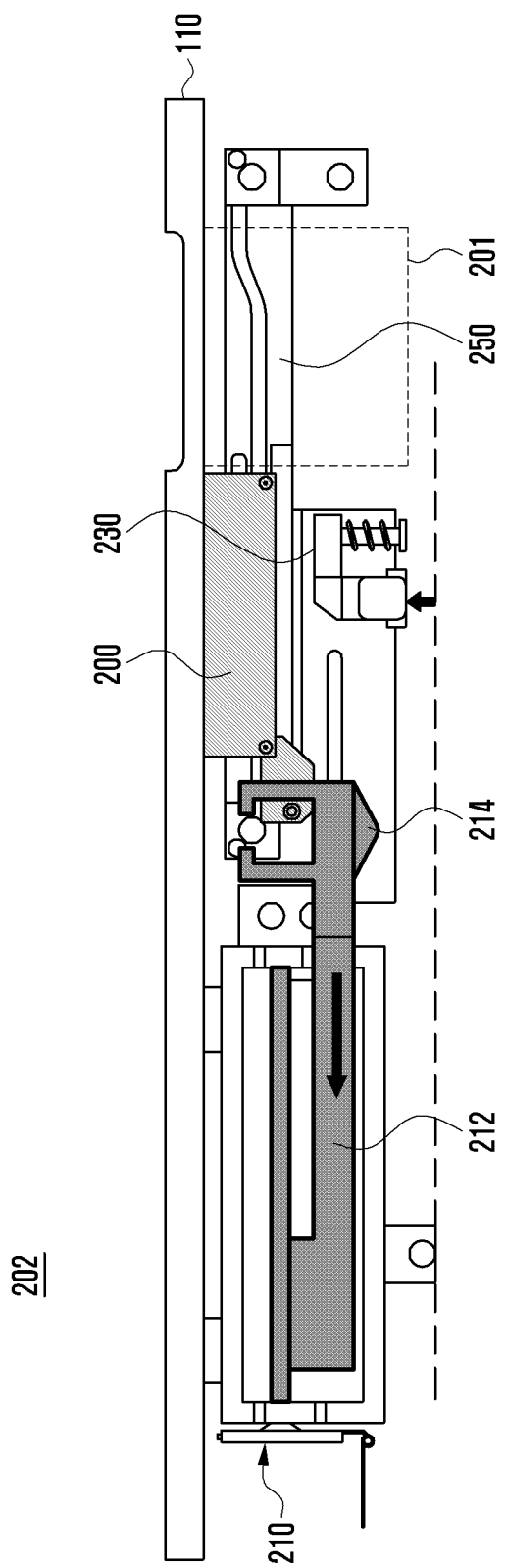

Referring to FIGS. 2C and 2D, when the driving actuator 210 is operated to open the opening 201 and the link 212 moves in the first direction, the slide door 200 may move together with the link 212 to open the opening 201.

For example, when the slide door 200 moves to open the opening 201 by the movement of the link 212, the slide door 200 may move along the guide rail 250 at least partially along an inward direction of the electronic device 101 and at least partially in the first direction (i.e., a moving direction of the link 212).

The forcible open blocker 230 of the electronic device 101 may include an elastic member that provides an elastic force for the forcible open blocker 230 to return to an earlier position re-blocking the opening, when a pushing pressure of the protruding portion 214 of the link 212 is released. As shown in FIGS. 2A and 2D, when pressure is no longer applied (e.g., no pushing pressure) by the protruding portion 214 of the link 212, the forcible open blocker 230 may be located at the position of blocking the forcible open of the slide door 200, and thereby prevent the slide door 200 from being forcibly opened.

Figure 3A:
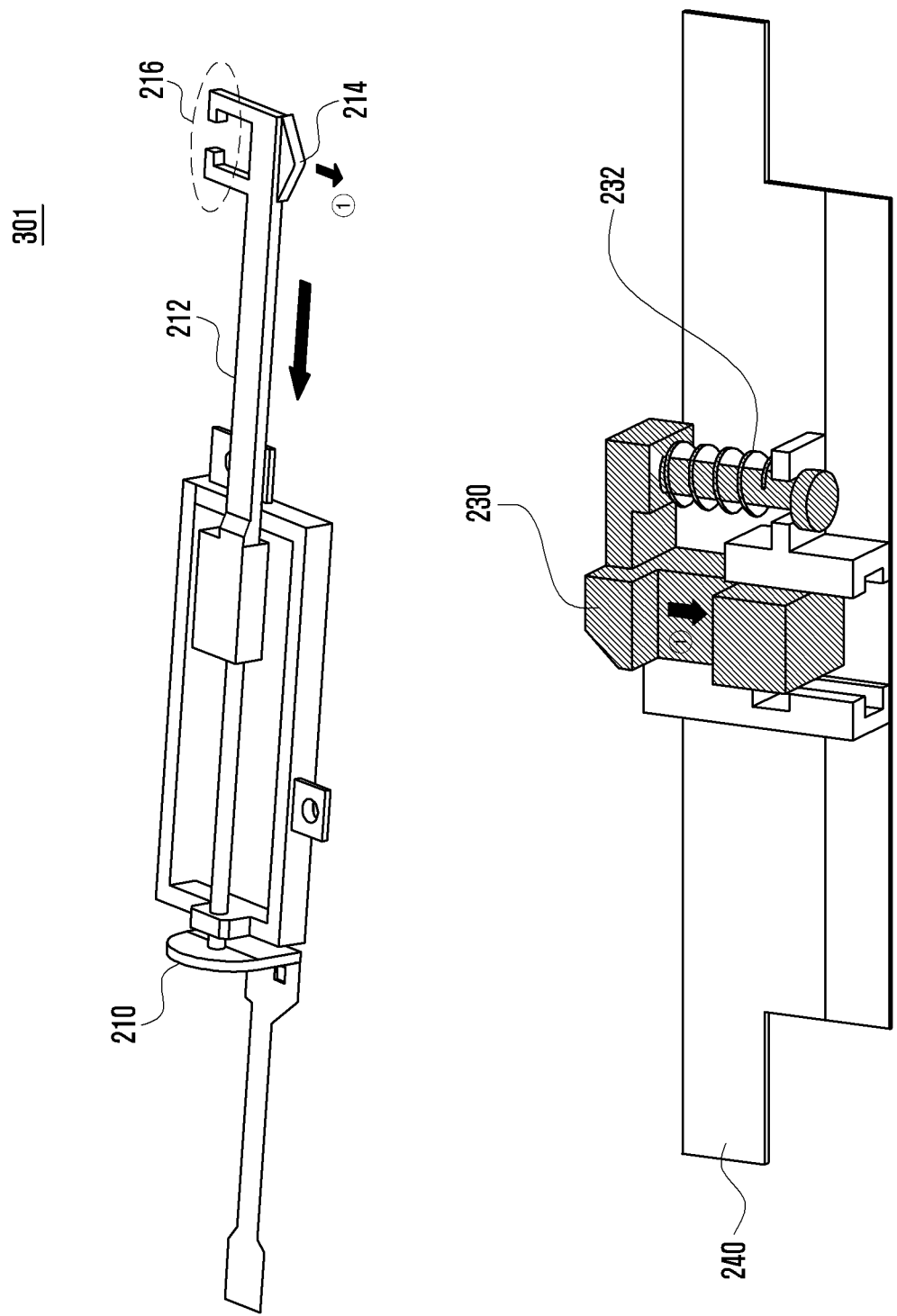
FIG. 3A is an exploded perspective view showing an example structure of a forcible open blocker that is pushed in accordance with a movement of a link in an electronic device according to certain embodiments.
Figure 3B:
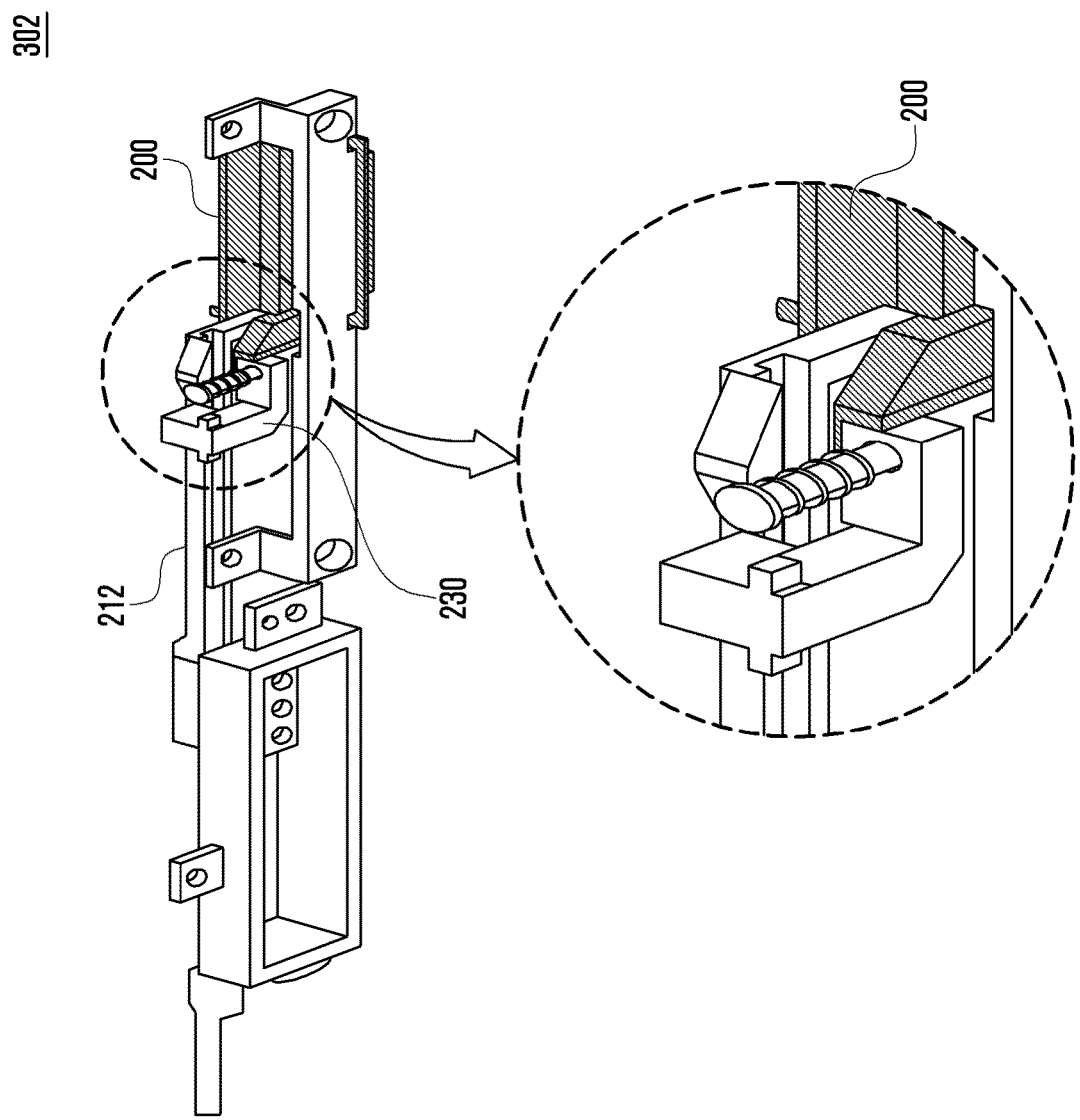
FIG. 3B is a perspective view showing a state in which an opening of a slide door is blocked by a forcible open blocker in an electronic device according to certain embodiments.
Figure 3C:
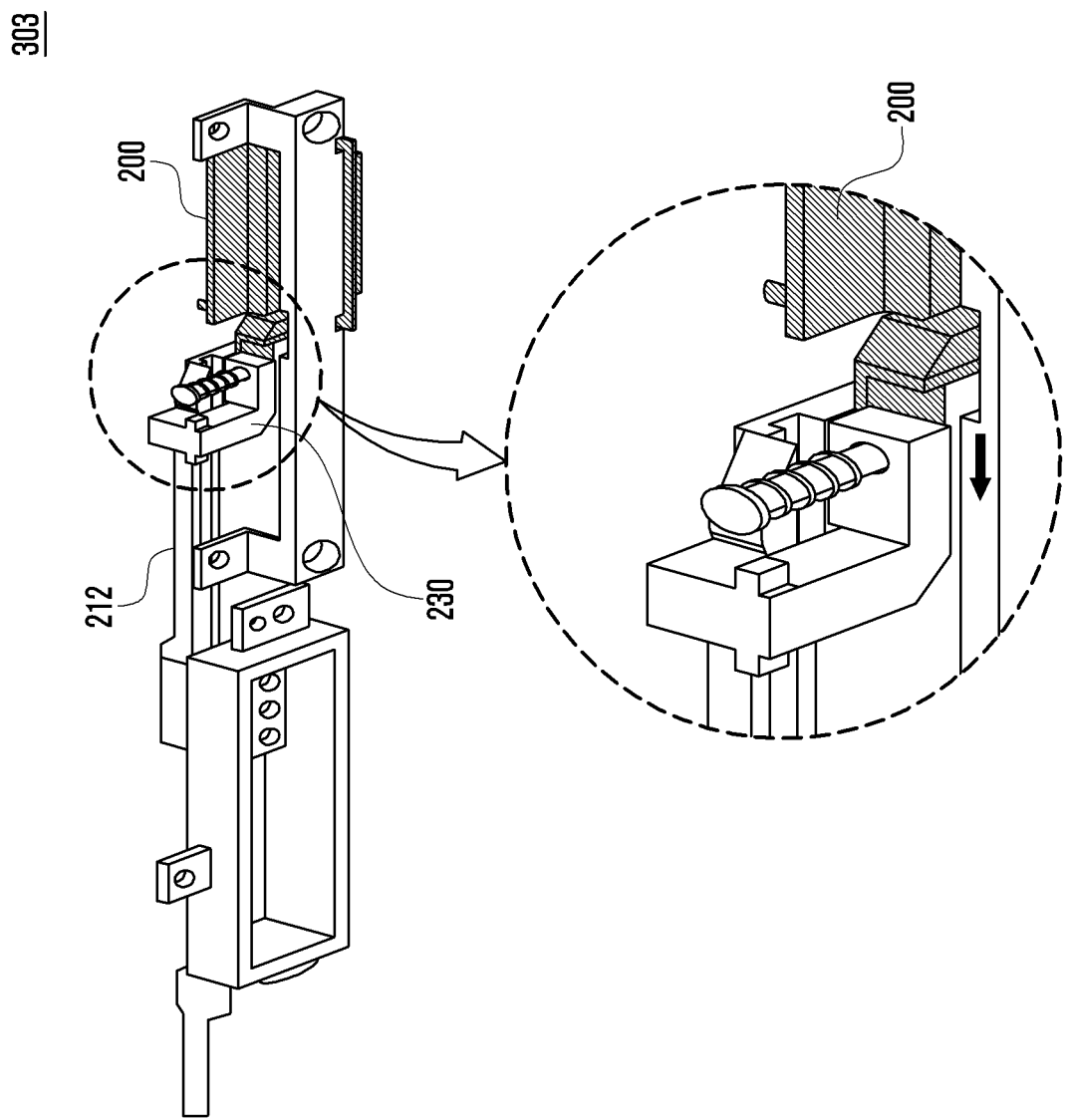
FIG. 3C is a perspective view showing a state in which an example restriction operation of a forcible open blocker is released in an electronic device according to certain embodiments.

FIGS. 3A to 3C are diagrams illustrating an operation of a forcible open blocker 230 blocking a forcible open of a slide door 200 in accordance with a movement of a link 212 in an electronic device 101 according to certain embodiments.

FIG. 3A is an exploded perspective view 301 showing a structure of the forcible open blocker 230 that is pushed in accordance with the movement of the link 212 in the electronic device 101 according to certain embodiments.

Referring to FIG. 3A, the link 212 connected to the driving actuator 210 may move linearly in accordance with the driving operation of the driving actuator 210. For example, the link 212 may include a protruding portion 214 which may push the forcible open blocker 230 and a ring-like portion 216, formed to engage with the slide door 200.

For example, when the link 212 moves linearly in a first direction (e.g., a direction in which the link 212 is away from the opening 201) or in a second direction opposite to the first direction by the driving actuator 210, the protruding portion 214 may push the forcible open blocker 230 in a direction (e.g., indicated by ① in FIG. 3A) perpendicular to the first or second direction. For example, the forcible open blocker 230 may be disposed adjacent to the protruding portion 214 of the link 212, and may be at least partially moved in the direction ① as shown in FIG. 3A by a pushing pressure of the protruding portion 214.

For example, when the pushing pressure of the protruding portion 214 is released, the forcible open blocker 230 may return to the direction opposite to the direction ①.

For example, the forcible open blocker 230 may include an elastic member 232. For example, as shown in FIG. 3A, the electronic device 101 may have therein a plate 240 for mounting the forcible open blocker 230 and the elastic member 232. Based on the respective structures of the plate 240, the forcible open blocker 230, and the elastic member 232, the forcible open blocker 230 may return to an original position (i.e., a position before the pushing pressure is applied) when the pushing pressure of the protruding portion 214 is released.

FIG. 3B is a perspective view showing a state 302 in which an opening of a slide door 200 is blocked by a forcible open blocker 230 in an electronic device 101 according to certain embodiments.

Referring to FIG. 3B, in the state where the forcible open of the slide door 200 is blocked, that is, in the state where the pushing pressure of the protruding portion 214 is not applied to the forcible open blocker 230, the slide door 200 engages with the forcible open blocker 230 and thereby is not moved.

FIG. 3C is a perspective view showing a state 303 in which a forcible open blocking operation of a forcible open blocker 230 is released in an electronic device 101 according to certain embodiments.

Referring to FIG. 3C, when the forcible open blocker 230 is pushed by the protruding portion 214 of the link 212 and thereby moves in the direction ① shown in FIG. 3A, the slide door 200 does not engage with the forcible open blocker 230 contrary to the case of FIG. 3B, and is movable freely in the first or second direction perpendicular to the direction ①. Therefore, when the forcible open blocking operation of the forcible open blocker 230 is released as shown in FIG. 3C, the slide door 200 can be opened or closed in accordance with the movement of the link 212.

Figure 4A:
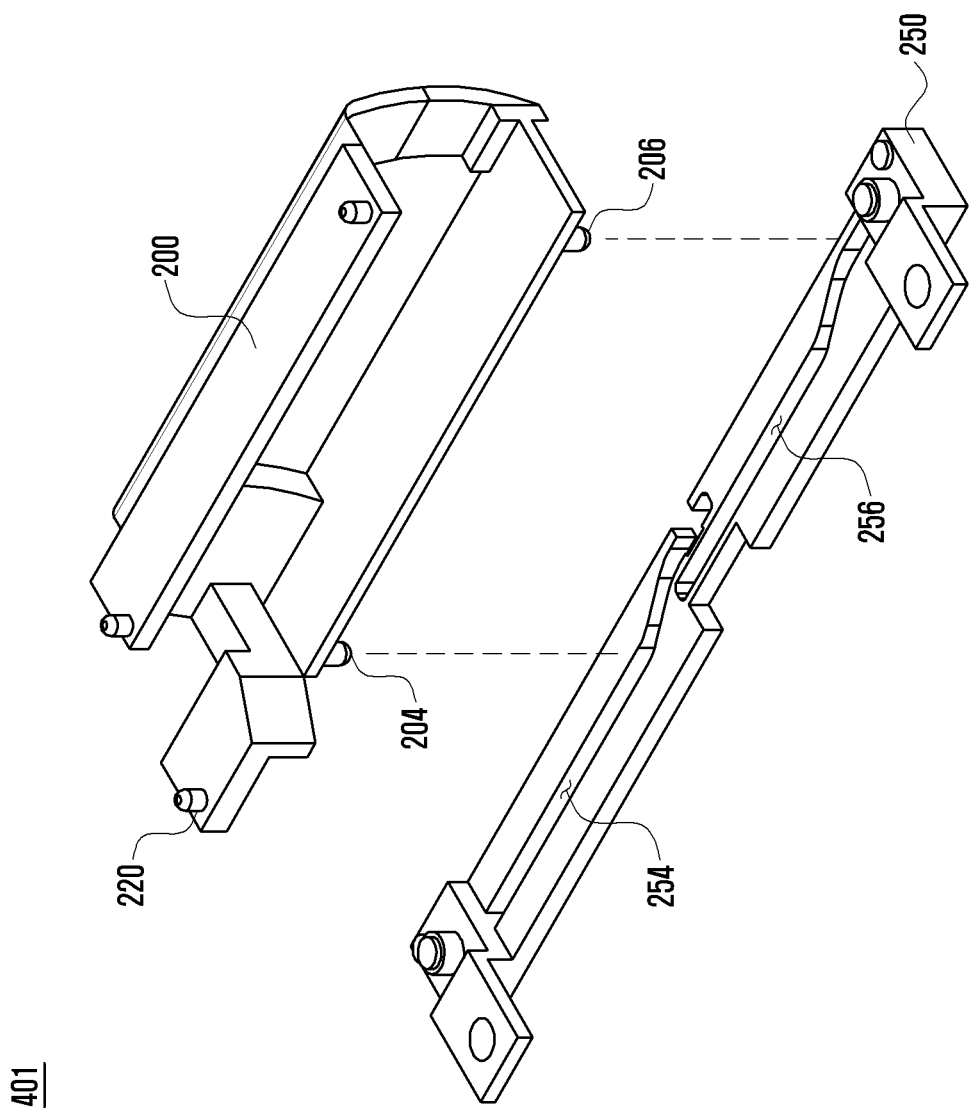
FIG. 4A is an exploded perspective view showing arrangements of an example slide door and a guide rail for guiding a movement of the slide door according to certain embodiments.
Figure 4B:
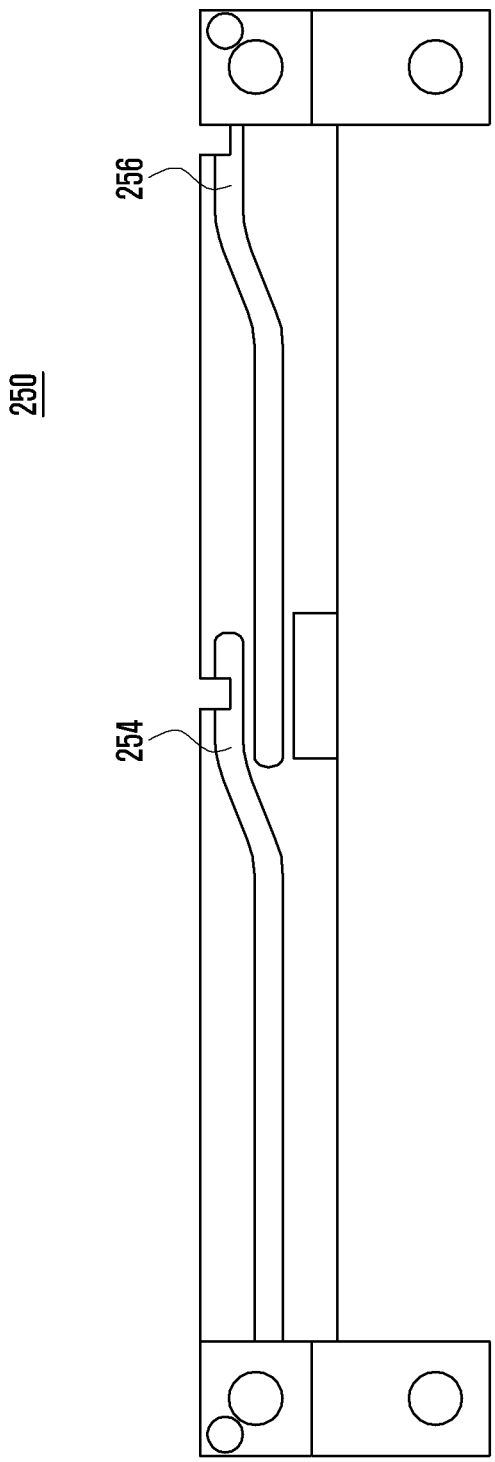
FIG. 4B is a plan view showing an example structure of a guide rail according to certain embodiments.
Figure 4C:
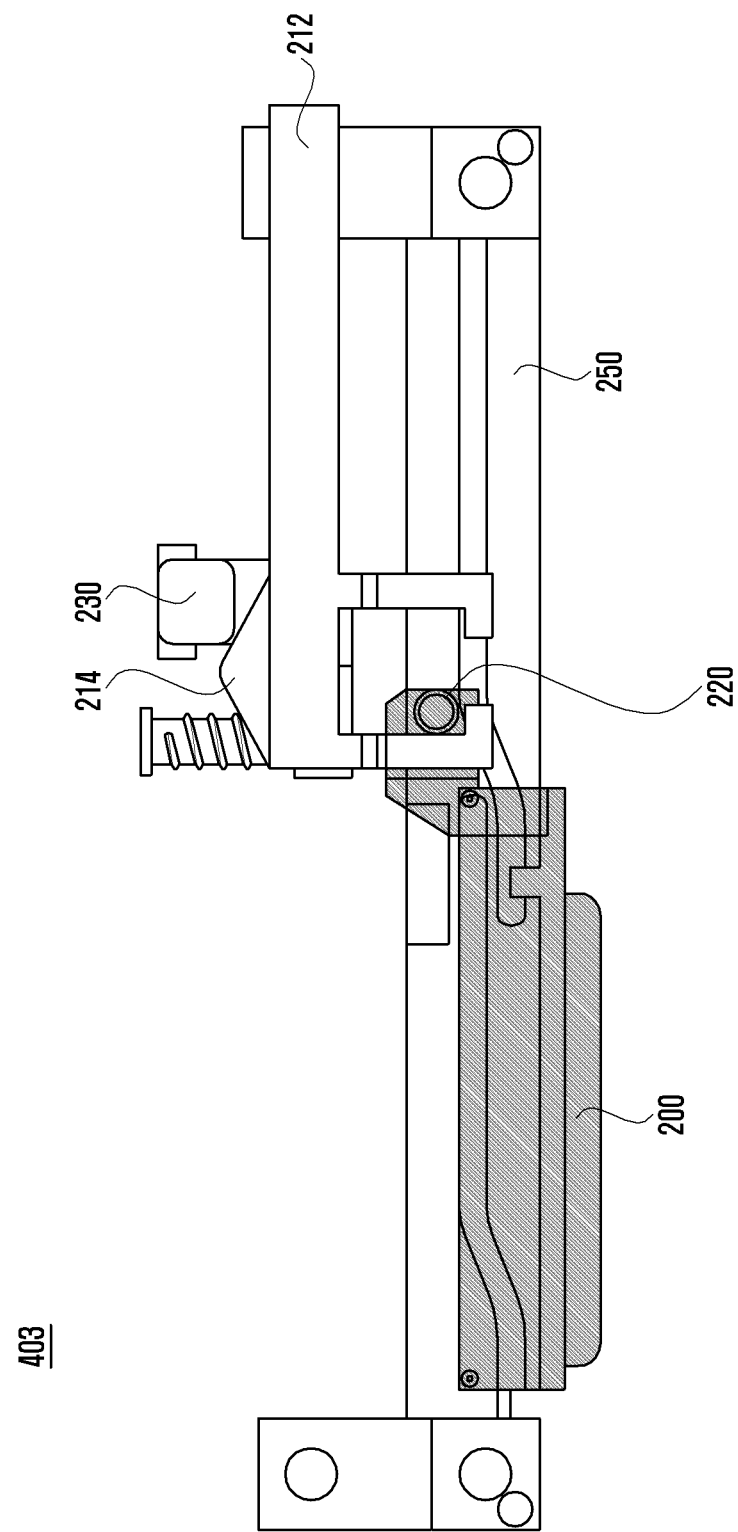
FIG. 4C is a view showing an example coupling structure of a slide door, a guide rail, a forcible open blocker, and a link according to certain embodiments.

FIG. 4A is an exploded perspective view showing arrangements 401 of a slide door 200 and a guide rail 250 for guiding a movement of the slide door according to certain embodiments. FIG. 4B is a plan view showing a structure of a guide rail 250 according to certain embodiments. FIG. 4C is a view showing a coupling structure 403 of a slide door 200, a guide rail 250, a forcible open blocker 230, and a link 212 according to certain embodiments.

Referring to FIGS. 4A, 4B and 4C, when the link 212 linearly moves, the slide door 200 may move to open or close along a path formed by at least one groove 254 and 256 in the guide rail 250.

For example, the guide rail 250 may be disposed under the slide door 200. The slide door 200 may include protrusions 204 and 206 respectively corresponding to the grooves 254 and 256 of the guide rail 250. The protrusions 204 and 206 may slide along the grooves 254 and 256 of the guide rail 250.

The slide door 200 may be physically connected to the link 212. For example, the slide door 200 may include, at one end thereof, a protruding portion 220 for coupling with the link 212. The protruding portion 220 of the slide door 200 may be disposed to engage with a ring-like portion of the link 212.

Although FIG. 4A shows that the guide rail 250 disposed under the slide door 200, this is provided as an example only. Alternatively, the guide rail 250 may be disposed above the slide door 200, or the guide rails 250 may be disposed above and under the slide door 200, respectively.

When opened or closed in accordance with the driving operation of the driving actuator, the slide door 200 may move at least partially in the movement direction of the link, and at least partially in the direction perpendicular to the movement direction of the link. For example, in order to guide the slide door 200 in moving at least partially in the inward direction of the electronic device 101 when the slide door 200 is opened, the guide rail 250 may include the grooves 254 and 256 as shown in FIGS. 4A and 4B.

Because the slide door 200 is opened while moving inwardly within at least in part into the electronic device 101 and sliding laterally in the electronic device 101, the electronic device 101 may be formed to be slimmer overall.

Referring to FIG. 4C, the ring-like portion of the link 212 (as shown in FIG. 4C) is provided as an example, and it is understood that any other modification of the ring-like portion may be used, if it can be engaged with the coupling portion 202 of the slide door 200.

According to certain embodiments, the electronic device 101 may include the forcible open block 230 that blocks the opening of the slide door 200 when the opening 201 is closed by the slide door 200, and moves to release the blockage in accordance with the movement of the link 212.

According to certain embodiments, the electronic device 101 may operate the driving actuator to open the slide door 200 that encloses the opening 201. The link 212 may move linearly in accordance with the driving operation of the driving actuator, and thereby open the slide door 200 via engagement with the link 212.

For example, when the driving actuator is operated to open the slide door 200, the protruding portion 214 of the link 212 may push the forcible open blocker 230 in accordance with a first movement of the link 212 produced by the driving operation of the driving actuator. As a result, the blockage provided by the forcible open blocker 230 is released. In addition, based on the first movement and the subsequent second movement of the link 212 produced by the driving operation of the driving actuator, the slide door 200 may slide along the grooves provided in the guide rail 250.

According to certain embodiments, when it is determined that a predetermined condition for closing the opening 201 is satisfied, the electronic device 101 may automatically close the slide door 200 to close the opening 201. A number of examples of the predetermined condition are provided below.

For example, an example condition may include detecting a lapse of a predetermined time after the slide door 200 is opened, after which the electronic device 101 may close the slide door 200.

Another example condition may include reception of an external input signal through the input module or the communication module that meets a predetermined authentication condition, after which the electronic device 101 may close the slide door 200.

Another example condition includes determining, based on a power supply control signal, that the system power supply to the electronic device 101 is stopped, after which the electronic device 101 may close the slide door 200.

As such, if it is determined that a condition for closing the opening 201 is satisfied, the electronic device 101 may operate the driving actuator to move the link 212 in the second direction opposite to the first direction where the link 212 moves for opening the opening 201.

The slide door 200 may move to a position of closing the opening 201 in accordance with the movement of the link 212 in the second direction.

According to certain embodiments, the forcible open blocker 230 may be transitioned to a blocking position by the movement of the link 212 in the second direction and the elastic force of the elastic member of the forcible open blocker 230. Therefore, when the opening 201 of the electronic device 101 is closed, the slide door 200 may disallow any opening, and permit opening by the driving operation of the driving actuator.

According to certain embodiments, the electronic device 101 may open or close the slide door 200 to open or close the opening 201 when a predetermined condition is satisfied. In particular, based on the linear movement of the link 212 in accordance with the driving operation of the driving actuator, the electronic device 101 can open the opening 201 easily and automatically by releasing the forcible open blocking of the forcible open blocker 230 and moving the slide door 200 without requiring any further operation. In addition, based on the linear movement of the link 212 in accordance with the driving operation of the driving actuator, the electronic device 101 can close the opening 201 by moving the slide door 200 and also enable the forcible open blocker 230 to effectively block the forcible open of the slide door 200. This is advantageous to enhancing the security of components that can be inserted into the opening 201.

According to certain embodiments, an electronic device may include a driving actuator; a slide door that opens or closes an opening of the electronic device; a link connecting the slide door and the driving actuator and linearly moving in accordance with a driving operation of the driving actuator to move the slide door; a forcible open blocker that blocks a forcible open of the slide door when the opening is closed, and that moves to release blocking of the forcible open, based on a linear movement of the link; and a processor configured to identify whether to open or close the opening through the slide door, based on an external input signal, and to operate the driving actuator to open or close the opening, based on a result of identifying.

In the electronic device, when the driving actuator is operated to open the opening, the forcible open blocker may release the blocking of the forcible open, based on a first movement of the link produced by the driving operation of the driving actuator, and the slide door may move to open the opening, based on the first movement and a subsequent second movement of the link produced by the driving operation of the driving actuator.

In the electronic device, the link may include a protruding portion formed on one surface thereof, and the forcible open blocker may be disposed to release the blocking of the forcible open when the protruding portion pushes the forcible open blocker by the first movement of the link.

In the electronic device, the forcible open blocker may include an elastic member that provides an elastic force for the forcible open blocker to return to a position of blocking the forcible open when a pushing pressure of the protruding portion is released.

In the electronic device, the slide door may be disposed to engage with a ring-like portion formed at one end of the link, and to open or close the opening in accordance with the linear movement of the link.

In the electronic device, the opening of the electronic device may allow an external memory card to be inserted.

In the electronic device, the processor may be further configured to receive, through an input module or a communication module, a user input for opening or closing the slide door as the external input signal, to identify whether the received user input meets a predetermined authentication condition, and to operate the driving actuator in response to the user input when the user input meets the authentication condition.

In the electronic device, the user input may include user's biometric information. In the electronic device, the external input signal may include a power supply control signal for the electronic device.

In the electronic device, the link may linearly move, in accordance with the driving operation of the driving actuator, in a direction parallel to one surface of a housing of the electronic device in which the opening is formed.

In the electronic device, the slide door may open or close the opening by moving at least partially in a direction perpendicular to the linearly moving direction of the link in accordance with the driving operation of the driving actuator.

The electronic device may further include a guide rail for guiding a movement of the slide door, such that in order to open the opening, the slide door moves along the guide rail at least partially in an inward direction of the electronic device.

According to certain embodiments, a method for opening or closing an opening of an electronic device through a slide door, a link, and a driving actuator which are provided in the electronic device may include receiving an external input signal; determining whether to open or close the opening, based on the external input signal; and when determining that the external input signal satisfies a condition for opening the opening, operating the driving actuator to produce a linear movement of the link connected to the driving actuator in a first direction, such that a forcible open blocker provided to block a forcible open of the slide door is moved to release blocking of the forcible open in accordance with the linear movement of the link in the first direction, and such that the slide door connected to the link moves to open the opening in accordance with the linear movement of the link in the first direction.

The method may further include, when determining that the external input signal satisfies a condition for closing the opening, operating the driving actuator to produce a linear movement of the link in a second direction opposite to the first direction, such that the slide door connected to the link moves to close the opening in accordance with the linear movement of the link in the second direction, and such that the forcible open blocker is moved to block the forcible open of the slide door in accordance with the linear movement of the link in the second direction.

In the method, the forcible open blocker may be disposed in the electronic device to disallow the slide door to be forcibly opened when the opening is closed.

In the method, the link may include a protruding portion formed on one surface thereof, and the forcible open blocker releases the blocking of the forcible open when the protruding portion pushes the forcible open blocker.

In the method, the first and second directions may be parallel to one surface of a housing of the electronic device in which the opening is formed, and the slide door may open or close the opening by moving at least partially in a direction perpendicular to the first and second directions.

In the method, the determining whether to open or close the opening, based on the external input signal, may include receiving, through an input module or a communication module, a user input as the external input signal, and determining whether the received user input meets a predetermined authentication condition.

In the method, the user input may include user's biometric information.

The method may further include operating the driving actuator to produce a linear movement of the link in a second direction opposite to the first direction in order to close the opening, when a predetermined time elapses after the opening is opened, when a power supply control signal for the electronic device is received, or when a user input for closing the slide door is received.

The electronic device according to certain embodiments may be one of various types of electronic devices. The electronic devices may include, for example, a portable communication device (e.g., a smart phone), a computer device, a portable multimedia device, a portable medical device, a camera, a wearable device, or a home appliance. According to embodiments of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "$1^{st}$" and "$2^{nd}$", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration.

According to certain embodiments, operations performed by the module, the program, or another component may be carried out sequentially, in parallel, repeatedly, or heuristically, or one or more of the operations may be executed in a different order or omitted, or one or more other operations may be added.

While the disclosure has been particularly shown and described with reference to example embodiments thereof, it will be understood by those skilled in the art that various changes in form and details may be made therein without departing from the subject matter as defined by the appended claims.

What is claimed is:

1. An electronic device, comprising:
    a housing defining an opening;
    a driving actuator;
    a slide door moveable to cover or expose the opening;
    a link connecting the slide door and the driving actuator, the link linearly moveable in accordance with a driving operation of the driving actuator to move the slide door;
    a forcible open blocker that is moveable to restrict exposure of the opening of the slide door when the opening is closed, and to release blockage of the opening of the slide door based on a linear movement of the link; and
    a processor configured to:
        receive an external input signal and identify whether to expose or cover the opening based on the external input signal, and
        activate the driving actuator to expose or cover the opening according to a result of the identification,
        wherein when the driving actuator is activated to expose the opening, the forcible open blocker releases the restriction of exposing the opening, based on a first movement of the link produced by the driving operation of the driving actuator, and
        wherein the slide door moves to expose the opening, based on the first movement and a subsequent second movement of the link as produced by the driving operation of the driving actuator.

2. The electronic device of claim 1, wherein the link includes a protruding portion formed on one surface thereof, and
    wherein the forcible open blocker is disposed to release the restriction of exposing the opening when the protruding portion pushes against the forcible open blocker responsive to the first movement of the link.

3. The electronic device of claim 2, wherein the forcible open blocker includes an elastic member providing an elastic force return the forcible open blocker to a first position blocking the opening, when a pushing pressure applied to the protruding portion is released.

4. The electronic device of claim 1, wherein the slide door engages with a ring portion formed at one end of the link, and
wherein the opening is covered and/or exposed in accordance with the linear movement of the link.

5. The electronic device of claim 1, wherein the opening defined in the housing of the electronic device is formed for insertion of an external memory card.

6. The electronic device of claim 1, further comprising an input module and a communication module, wherein the processor is further configured to:
receive, through the input module or the communication module, a user input requesting covering or the slide door as the external input signal, and
identify whether the received user input meets a predetermined authentication condition,
wherein the driving actuator is activated when the user input meets the predetermined authentication condition.

7. The electronic device of claim 6, wherein the user input includes biometric information.

8. The electronic device of claim 1, wherein the external input signal includes a power supply control signal for the electronic device.

9. The electronic device of claim 1, wherein in accordance with the driving operation of the driving actuator, the link linearly moves, in a direction parallel to one surface of a housing of the electronic device in which the opening is formed.

10. The electronic device of claim 9, wherein the slide door exposes or covers the opening by moving at least partially in a direction perpendicular to a direction of the linear movement of the link, in accordance with the driving operation of the driving actuator.

11. The electronic device of claim 1, further comprising:
a guide rail for guiding the linear movement of the slide door,
wherein the slide door moves along the guide rail at least partially towards an inward direction of the electronic device.

12. A method in an electronic device, the method comprising:
receiving by an input unit and/or a communication unit an external input signal;
determining, by a processor, whether to expose or cover an opening defined in a housing of the electronic device based on the external input signal; and
when the external input signal satisfies a condition for exposing the opening, activating a driving actuator to produce a linear movement of a link in a first direction,
wherein the linear movement of the link in the first direction causes a forcible open blocker to release restriction of exposing the opening, the forcible open blocker releases the restriction of exposing the opening based on a first movement of the link produced by a driving operation of the driving actuator, and
wherein a slide door connected to the link moves to expose the opening in accordance with the linear movement of the link in the first direction, the slide door moving to expose the opening based on the first movement and a subsequent second movement of the link as produced by the driving operation of the driving actuator.

13. The method of claim 12, further comprising:
when determining that the external input signal satisfies a condition for closing the opening, operating the driving actuator to produce a second linear movement of the link in a second direction opposite to the first direction,
wherein the slide door connected to the link moves to cover the opening in accordance with the second linear movement of the link in the second direction, and
wherein the forcible open blocker is moved to restrict exposing the opening by movement of the slide door in accordance with the second linear movement of the link in the second direction.

14. The method of claim 12, wherein the forcible open blocker is disposed in the electronic device and restricts movement of the slide door when the opening is covered by the slide door.

15. The method of claim 14, wherein the link includes a protruding portion formed on one surface thereof, and
wherein restriction against exposing the opening is released when the protruding portion pushes against the forcible open blocker.

16. The method of claim 13, wherein the first and second directions are both parallel to one surface of the housing, and
the slide door exposes or covers the opening by moving at least partially in a third direction perpendicular to the first and second directions.

17. The method of claim 12, wherein the external input signal includes a user input, and determining whether to expose or cover the opening based on the external input signal further includes:
determining whether the user input satisfies a predetermined authentication condition.

18. The method of claim 17, wherein the user input includes biometric information.

19. The method of claim 12, further comprising:
when a predetermined condition is detected, activating the driving actuator to produce a second linear movement of the link in a second direction opposite to the first direction to cover the opening,
wherein the predetermined condition includes one or more of:
lapse of a predetermined time period after the opening is exposed,
reception of a power supply control signal for the electronic device, and
reception of a user input requesting covering the opening by closure of the slide door.

* * * * *